(12) United States Patent
Lamprecht et al.

(10) Patent No.: US 12,480,723 B2
(45) Date of Patent: Nov. 25, 2025

(54) TEMPERATURE EQUALIZING PLATE FOR A MICROPLATE READER AND MICROPLATE READER WITH SUCH A TEMPERATURE EQUALIZING PLATE

(71) Applicant: TECAN TRADING AG, Männedorf (CH)

(72) Inventors: Waltraud Lamprecht, Fuschl am See (AT); Manfred Lansing, Salzburg (AT); Josef Grassl, Schönau am Königssee (DE); Tobias Sawetzki, Bischofswiesen (DE)

(73) Assignee: TECAN TRADING AG, Männedorf (CH)

( * ) Notice: Subject to any disclaimer, the term of this patent is extended or adjusted under 35 U.S.C. 154(b) by 104 days.

(21) Appl. No.: 18/390,579

(22) Filed: Dec. 20, 2023

(65) Prior Publication Data
US 2024/0210124 A1    Jun. 27, 2024

(30) Foreign Application Priority Data
Dec. 27, 2022    (EP) .................................... 22216831

(51) Int. Cl.
*B01L 3/00* (2006.01)
*F28F 3/12* (2006.01)
(Continued)

(52) U.S. Cl.
CPC .............. *F28F 3/12* (2013.01); *B01L 3/5027* (2013.01); *F28F 21/062* (2013.01); *F28F 21/081* (2013.01); *B01L 2300/18* (2013.01)

(58) Field of Classification Search
CPC .......... F28F 3/12; F28F 21/062; F28F 21/081; B01L 3/5027; B01L 2300/18
(Continued)

(56) References Cited

U.S. PATENT DOCUMENTS 4,349,632 A * 9/1982 Lyman ................... C12M 23/12
                                                    217/58
4,902,624 A * 2/1990 Columbus ................ B01L 7/52
                                                   422/562
(Continued)

FOREIGN PATENT DOCUMENTS

| EP | 2835178 A1 | 2/2015 |
| EP | 3454064 A1 | 4/2019 |

OTHER PUBLICATIONS

European Search Report for corresponding European application No. 22216831.2, dated Mar. 6, 2023.

*Primary Examiner* — Claire E Rojohn, III
(74) *Attorney, Agent, or Firm* — Notaro, Michalos & Zaccaria P.C.

(57) ABSTRACT

A temperature equalizing plate (1) for a micro plate reader (4), onto which temperature equalizing plate (1) a microplate with wells can be removably arranged, the temperature equalizing plate (1) having a plate-shaped body, wherein a first vertical offset is provided between four upward facing corner surfaces (100) and four upward facing edge surfaces (110) and wherein a second vertical offset is provided between the four upward facing edge surfaces (110) and one upward facing center surface (120), resulting in gaps between at least some of the upward facing surfaces (100; 110;120) of the temperature equalizing plate (1) and corresponding wells of the thereon arranged microplate.

21 Claims, 7 Drawing Sheets

(51) Int. Cl.
*F28F 21/06* (2006.01)
*F28F 21/08* (2006.01)

(58) Field of Classification Search
USPC .......................................... 165/168; 356/246
See application file for complete search history.

(56) References Cited

U.S. PATENT DOCUMENTS

| | | | | |
|---|---|---|---|---|
| 5,162,101 | A * | 11/1992 | Cosentino | F28F 21/062 422/46 |
| 5,462,874 | A * | 10/1995 | Wolf | C12M 23/12 435/297.5 |
| 5,487,872 | A * | 1/1996 | Hafeman | B01L 3/5085 D24/224 |
| 5,801,055 | A * | 9/1998 | Henderson | B01L 3/50255 435/297.5 |
| 5,972,694 | A * | 10/1999 | Mathus | B01L 3/50255 422/534 |
| 6,258,326 | B1 * | 7/2001 | Modlin | B01L 3/5085 436/164 |
| 7,018,588 | B2 * | 3/2006 | DeSilets | B01L 9/523 422/534 |
| 7,128,878 | B2 * | 10/2006 | Muser | B01L 3/5085 422/552 |
| 7,135,148 | B2 * | 11/2006 | DeSilets | B01L 3/50255 422/534 |
| 7,135,149 | B2 * | 11/2006 | DeSilets | C12M 23/12 422/534 |
| D533,948 | S * | 12/2006 | Schaub | D24/229 |
| 7,148,060 | B2 * | 12/2006 | Pitt | B01L 3/5025 435/297.5 |
| D574,505 | S * | 8/2008 | Muller-Cohn | D24/216 |
| 7,968,061 | B2 * | 6/2011 | Goodwin | B01L 3/502753 422/534 |
| 8,551,771 | B2 * | 10/2013 | Wu | C12M 25/14 435/297.5 |
| 9,492,820 | B2 * | 11/2016 | Reed | B01L 3/502715 |
| 9,573,128 | B1 * | 2/2017 | McClelland | B01L 3/502715 |
| 9,885,652 | B2 * | 2/2018 | Papin | G01N 21/253 |
| 10,035,145 | B2 * | 7/2018 | McClelland | F04B 13/00 |
| D840,053 | S * | 2/2019 | Kamees | D24/230 |
| 10,252,272 | B2 * | 4/2019 | Pallas | B01L 3/50851 |
| 10,989,725 | B2 * | 4/2021 | Ren | G01N 35/00584 |
| 11,041,872 | B2 * | 6/2021 | Noda | B65G 60/00 |
| 11,092,613 | B2 * | 8/2021 | Mahmudimanesh | G01N 35/04 |
| 11,103,872 | B2 * | 8/2021 | Belz | B01L 9/06 |
| 11,112,421 | B2 * | 9/2021 | Sinz | B01L 3/502715 |
| 11,148,141 | B2 * | 10/2021 | Seitter | B01L 9/52 |
| 11,173,488 | B2 * | 11/2021 | Savran | B01L 3/502761 |
| 11,179,726 | B2 * | 11/2021 | Knight | B01L 3/527 |
| 11,213,815 | B2 * | 1/2022 | Inzé | B01L 9/523 |
| 11,226,348 | B2 * | 1/2022 | Vollenweider | G01N 35/04 |
| 11,608,483 | B2 * | 3/2023 | Mackowiak | C12M 23/12 |
| 11,747,356 | B2 * | 9/2023 | Bates | B01L 9/06 422/63 |
| D1,014,781 | S * | 2/2024 | Ohsaka | D24/229 |
| 11,958,051 | B2 * | 4/2024 | Lansing | G01N 21/59 |
| 11,971,420 | B2 * | 4/2024 | Hafner | G01N 35/00584 |
| D1,030,092 | S * | 6/2024 | Ohsaka | D24/229 |
| 12,000,850 | B2 * | 6/2024 | Schmitt | G06F 3/046 |
| 12,049,615 | B2 * | 7/2024 | Li | C12M 41/06 |
| 12,105,106 | B2 * | 10/2024 | Gilligan | G01N 35/025 |
| 12,115,528 | B2 * | 10/2024 | Von Beichmann | B01L 3/0237 |
| 12,146,129 | B2 * | 11/2024 | Schober | C12M 37/04 |
| 12,152,987 | B2 * | 11/2024 | Rager | B01L 3/50851 |
| D1,060,724 | S * | 2/2025 | Ohsaka | D24/230 |
| 2002/0001855 | A1 * | 1/2002 | Prentiss | G01N 19/04 436/526 |
| 2002/0189374 | A1 * | 12/2002 | DeSilets | C12M 23/12 73/864.51 |
| 2002/0192120 | A1 | 12/2002 | Desilets | |
| 2003/0013184 | A1 * | 1/2003 | Streit | B01L 9/06 435/286.7 |
| 2003/0026738 | A1 * | 2/2003 | Everett | B01L 3/50255 422/942 |
| 2003/0116497 | A1 * | 6/2003 | Carlson | B01L 3/50255 422/534 |
| 2004/0087005 | A1 * | 5/2004 | Henderson | B01L 3/50255 435/283.1 |
| 2005/0136506 | A1 * | 6/2005 | Kamath | B01L 3/50255 435/29 |
| 2005/0225751 | A1 * | 10/2005 | Sandell | B01L 3/5027 356/236 |
| 2006/0286003 | A1 * | 12/2006 | Desilets | C12M 25/04 422/400 |
| 2009/0086198 | A1 * | 4/2009 | Gotschy | B01L 3/5088 356/246 |
| 2012/0129208 | A1 * | 5/2012 | Khine | B01L 3/5085 435/325 |
| 2012/0190591 | A1 * | 7/2012 | Wohlstadter | G01N 21/66 506/39 |
| 2013/0109081 | A1 * | 5/2013 | Tsuchiya | G02B 21/30 435/286.1 |
| 2014/0273070 | A1 * | 9/2014 | Hale | G01N 1/40 435/283.1 |
| 2015/0140570 | A1 * | 5/2015 | Fu | C12M 23/22 435/7.1 |
| 2016/0003859 | A1 * | 1/2016 | Wenczel | G01N 35/04 422/561 |
| 2017/0151564 | A1 * | 6/2017 | Stanwood | B01L 3/502715 |
| 2018/0045641 | A1 * | 2/2018 | Zeder | G01N 35/028 |
| 2018/0221876 | A1 * | 8/2018 | Khaing Oo | B01L 3/502715 |
| 2019/0195807 | A1 * | 6/2019 | Lansing | G01N 21/15 |
| 2021/0102965 | A1 | 4/2021 | Posch | |
| 2021/0187500 | A1 * | 6/2021 | Lansing | C12M 23/12 |
| 2023/0083515 | A1 * | 3/2023 | Lansing | B01L 3/50851 422/509 |
| 2024/0210124 | A1 * | 6/2024 | Lamprecht | B01L 3/5027 |

* cited by examiner

TEMPERATURE EQUALIZING PLATE FOR A MICROPLATE READER AND MICROPLATE READER WITH SUCH A TEMPERATURE EQUALIZING PLATE

CROSS-REFERENCE TO RELATED APPLICATIONS

This patent application claims the benefit and priority of European Patent Application No. 22 216 831.2, filed on Dec. 27, 2022, the disclosure of which is incorporated by reference herein in its entirety as part of the present disclosure.

TECHNICAL FIELD OF THE INVENTION

The current invention relates to a temperature equalizing plate for a microplate reader and a microplate reader with such a temperature equalizing plate.

DESCRIPTION OF THE RELATED ART

Known microplate readers comprise a frame-shaped carriage for transporting the microplates from an exterior of the reader into its interior, wherein the analysis of the content of the wells of the microplates or well plates takes place inside the reader. Since temperature has an important influence, for example on the measurement results, the incubation of cells or bacteria, the triggering of biochemical reactions, the "clotting" of LAL (limulus amebocyte lysate), the temperature inside the reader is controlled. When a microplate is placed on the carriage and transferred into the reader, over time, the temperature of the microplate and consequently the temperature of the content of the wells of the microplate approach that of the inside of the reader. The temperature transfer between the reader's inner atmosphere and the wells of the microplate takes place mainly by convection and by thermal radiation. When the reader's inner atmosphere is wormer than the inserted microplate, the heat is transmitted from the carriage to the microplate, and when the reader's inner atmosphere is colder than the inserted microplate, the heat is transmitted from the microplate to the carriage. wherein the heat transfer is greatest in the corner areas, followed by the edge areas and the heat input is lowest in the central area.

With known frame-shaped carriages, the wells in the peripheral area of the microplate heat up or cool down faster than those in the inner area of the microplate, wherein the four corner wells heat up or cool down the fastest, followed by the wells in the four edge areas. The heating up or cooling down of the well is slower, the further it is away from the corner areas, or the edge areas, respectively. The uneven heating or cooling of the wells of the microplate leads to different measurement results during the heating phase. Consequently, in some cases, it is necessary to wait until all wells are at the same temperature before measurements can begin, resulting in long cycle times. In other cases, the reaction time of an event must be determined. Since the reaction time is temperature dependent, a rapid and homogeneous temperature equalization is essential. When performing temperature critical measurements within a plate reader, e.g., nephelometric endotoxin detection, a rapid and homogeneous heating process over all wells of a microplate is imperative to produce robust results.

SUMMARY OF THE INVENTION

It is a task of the current invention to provide a means that allows fast, uniform, and simultaneous heating of all wells of the microplate.

This task is solved by a temperature equalizing plate with the features of claim 1. Further embodiments of the temperature equalizing plate, as well as a microplate reader with such a temperature equalizing plate are defined by the features of further claims.

A temperature equalizing plate according to the invention comprises a plate-shaped body extending in a first horizontal direction and in a second horizontal direction, perpendicular to the first horizontal direction and comprising four corner areas, four edge areas and one center area. Each edge area is arranged between two neighboring corner areas and the center area is arranged between the four edge areas. A first vertical offset is provided between an upward facing corner surface of the corner areas and an upward facing edge surface of the edge areas and a second vertical offset is provided between the upward facing edge surface of the edge areas and an upward facing center surface of the center area. These vertical offsets resulting in gaps between at least some of the upward facing surfaces of the temperature equalizing plate and the corresponding wells of the microplate when it is arranged on the temperature equalizing plate. The design of the temperature equalizing plate resulting in a uniform and rapid heating of the wells of the microplate. Thus, the maximal well temperature is reaches faster with a temperature equalizing plate than without one and the difference between the maximal well temperature and the minimal well temperature with respect to all wells is smaller with the temperature equalizing platen than without one.

In one embodiment, the first vertical offset equals the second vertical offset. Alternatively, the first vertical offset can differ from the second vertical offset.

In one embodiment, the first vertical offset is smaller than the second vertical offset. The second vertical offset can be a multiple of the first vertical offset. Alternatively, the first vertical offset can be bigger than the second vertical offset. The first vertical offset can be a multiple of the second vertical offset.

In one embodiment, temperature equalizing plate comprises a rectangular array of through-holes, extending in the first horizontal direction and in the second horizontal direction, wherein four corner holes are arranged in the four corresponding corner areas, edge holes are arranged in the four corresponding edge areas (11) and center holes (15) are arranged in the center area (12) of the array of through-holes (13;14;15). A rectangular array of through-holes is preferred, however, other arrangements, such as for example a honeycomb arrangement, are also possible.

In one embodiment, the upward facing corner surface, the upward facing edge surface and the upward facing center surface are directed vertically upwards. Alternatively, they are directed upwards and towards a central axis of the corresponding through-holes. Depending on the shape of the wells of the microplate, the upward facing surfaces of the temperature equalizing plate can have shapes that are correspondingly matching, resulting in an essentially constant gap between all areas of the outside surface of one well and the corresponding upward facing surface of the temperature equalizing plate.

In one embodiment, the upward facing corner surface is comprised in a corner elevation, the upward facing edge surface is comprised in an edge elevation and the upward facing center surface is comprised in a center elevation.

In one embodiment, the corner elevation, the edge elevation, and the center elevation are separate or sectionally interconnected pins that are arranged between the through-holes. Alternatively, they can be webs that extend between the through-holes in the first horizontal direction and the second horizontal direction.

In one embodiment, two opposing first edge areas comprise the number of through-holes in the first horizontal direction minus two, two opposing second edge areas comprise the number of through-holes in the second horizontal direction minus two and the central area comprises the number of through-holes in the first horizontal direction minus two, times the number of through-holes in the second horizontal direction minus two.

In one embodiment, the array of through-holes is a 12-array with 3 by 4 through-holes or a 24-array with 4 by 6 through-holes or 48-array with 6 by 8 through-holes or a 96-array, with 8 by 12 through-holes or a 384-array with 16 by 24 through-holes or a 1536-array with 32 by 48 through-holes.

Since the diameters of the wells of the microplate vary from approximately 1 mm for a 1536-array, up to approximately 15 mm for a 12-array, the diameter of the through-holes can be in an appropriate range, if the full diameter of the well is to be visible, e.g., when a whole well imaging is desired. If it is permissible for a measurement that only a partial range of the well diameter is visible, then a through-hole diameter that is minimally in the order of magnitude of the measuring beam diameter of about 0.1 mm would be sufficient, e.g., for absorbance measurements, fluorescence measurements or turbidimetric measurements.

In one embodiment, an outer area is provided horizontally outward the four corner areas and the four edge areas, wherein a third vertical offset is provided between an upward facing outer surface of the outer area and the upward facing corner surface of the corner area.

In one embodiment, the third vertical offset equals the first vertical offset and/or the second vertical offset. Alternatively, the third vertical offset can differ from the first vertical offset and the second vertical offset.

In one embodiment, lateral recesses are formed in the outer area of the temperature equalizing plate. When assembled, positioning pins can be arranged in the lateral recesses.

In one embodiment, the lateral recesses are formed laterally in the periphery of the outer area of the temperature equalizing plate.

In one embodiment, the first vertical offset ranges from 0.1 mm to 5.0 mm and the second vertical offset ranges from 0.1 mm to 5.0 mm. For example, the first vertical offset can be 0.5 mm and the second vertical offset can be 0.5 mm.

In one embodiment the maximal plate thickness of the temperature equalizing plate ranges from 0.5 mm to 12.0 mm. For example, the thickness can be 4.0 mm.

In one embodiment, a bottom recess is formed at the bottom of the bottom of the outer area. The depth of the bottom recess ranges from 0.1 mm to 10.0 mm. For example, the bottom recess can have a depth of 0.7 mm.

In one embodiment, the third vertical offset ranges from 0.1 mm to 10.0 mm. For example, the third vertical offset ca be 1.3 mm.

The temperature equalizing plate can be made from a thermally conductive material, such as thermally conductive plastic or thermally conductive metal. For example, the temperature equalizing plate can be made from aluminum or stainless steel. The temperature equalizing plate can also be made from a material, transparent in a wavelength range of 200 nanometers to 1000 nanometers. Such a material can be fused quartz or sapphire, or a transparent plastic such as polycarbonate. When the temperature equalizing plate has through-holes, it is also possible to fill them with such a transparent material as mentioned above.

The features of the above-mentioned embodiments of the temperature equalizing plate can be used in any combination, unless they contradict each other.

A kit according to the invention comprises a temperature equalizing plate according to one of the preceding embodiments and a microplate with a rectangular array of wells, extending in the first horizontal direction and in the second horizontal direction. The through-holes of the temperature equalizing plate are aligned with the wells of the microplate. The first vertical offset and the second vertical offset resulting in a first gap between the upward facing corner surface of the corner areas and a corresponding corner well and in a second gap between the upward facing edge surface of the edge areas and a corresponding edge well. These gaps can range from 0.1 mm to 5.0 mm. The gaps are defined by a normal between the upward facing surfaces of the temperature equalizing plate and outer surfaces of corresponding wells. These gaps can stay constant with an increasing distance from the central axis of a corresponding through-hole or well, respectively.

In one embodiment, the first vertical offset and the second vertical offset resulting in a third gap between the upward facing center surface of the center area and a corresponding center well. Alternatively, the bottom of the wells of the microplate can touch the temperature equalizing plate.

In one embodiment, the first gap is bigger than the second gap and the second gap is bigger than the third gap.

In one embodiment, an outer dimension of the temperature equalizing plate in the first horizontal direction is smaller than a corresponding inner dimension of a frame of a microplate to be placed thereon, and an outer dimension of the temperature equalizing plate in the second horizontal direction is smaller than a corresponding inner dimension of the frame of the microplate. Such a design allows the microplate to be put over the temperature equalizing plate, since, when arranged on the carriage, a lateral gap is formed between the temperature equalizing plate and the carriage. This allows the placement of the microplate directly onto the carriage and no adjustment to the measurement procedure is required to compensate for a higher placement of the microplate in the microplate reader.

Any kind of microplate can be used in combination with a temperature equalizing plate according to the invention. The microplate can have round or square wells with square or rounded corners. The bottom of the wells can be flat, C-shaped, U-shaped or V-shaped.

In one embodiment, the first gap and/or the second gap is a multiple of the third gap.

A micro plate reader according to the invention comprises a housing with at least one opening, through which a carriage can transport microplates in the first horizontal direction from an exterior of the reader into its interior, and vice versa. The carriage comprises a temperature equalizing plate according to one of the aforementioned embodiments or a kit according to one of the aforementioned embodiments.

In one embodiment, the carriage comprises a front part that can pass through the at least one opening and a back part, which always remains in the housing, and which is connected to a drive, with which a movement in the first horizontal direction can be effected. The front part of the carriage is frame-shaped, and the temperature equalizing plate is arranged thereon. Alternatively, the temperature equalizing plate is formed integrally in a single piece with the front part of the carriage.

In one embodiment, the front part of the carriage comprises a cut-out and the rectangular array of through-holes of the temperature equalizing plate is accessible therethrough.

In one embodiment, the frame sections of the frame-shaped front part are continuous.

Alternatively, they can be interrupted. The lateral frame sections or the front frame section can comprise an interruption in the form of a gap, resulting in a hook-shaped or fork-shaped front part.

In one embodiment, a vertically extending recess is provided in the front part of the carriage, and the temperature equalizing plate is arranged in said vertically extending recess.

In one embodiment, positioning pins that extend vertically upwards are arranged in the peripheral area of the vertically extending recess of the front part of the carriage.

BRIEF DESCRIPTION OF THE DRAWINGS

Embodiments of the current invention are described in more detail in the following with reference to the figures. These are for illustrative purposes only and are not to be construed as limiting. It shows FIG. 1 a perspective view of a temperature equalizing plate according to the invention.

DETAILED DESCRIPTION OF THE INVENTION

Figure 1:
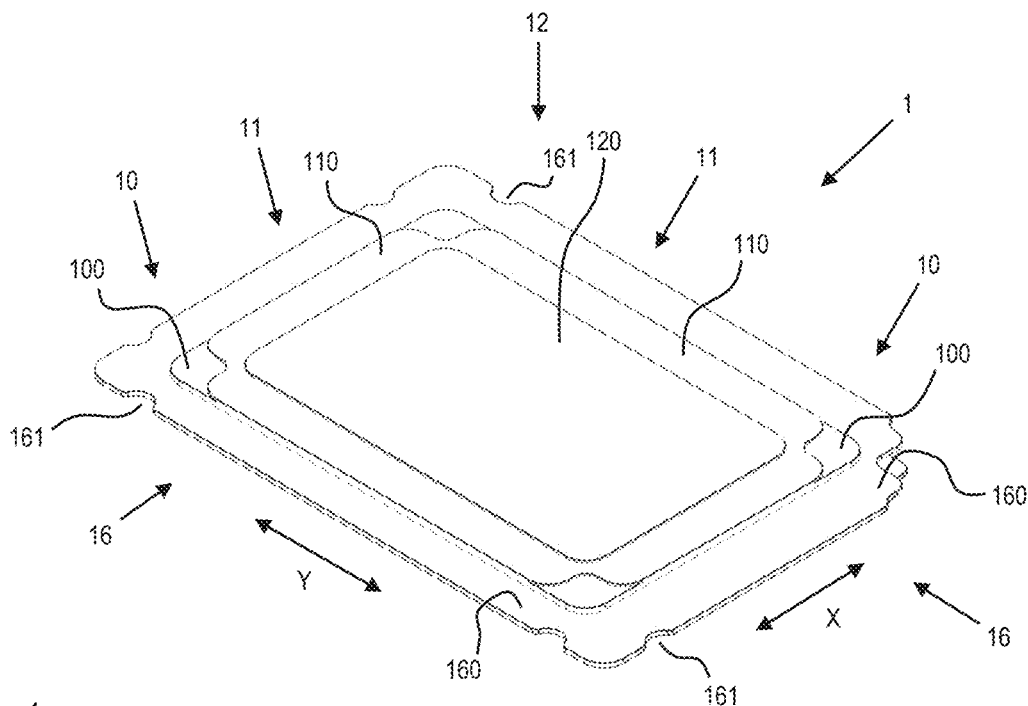

FIG. 1 shows a perspective view of a temperature equalizing plate 1 according to the invention. It comprises a plate-shaped body, extending in a first horizontal direction X and in a second horizontal direction Y, perpendicular to the first horizontal direction X. There are four corner areas 10, four edge areas 11 and one center area 12. Each edge area 11 is arranged between two neighboring corner areas 10 and the center area 12 is arranged between the four edge areas 11. A first vertical offset is provided between an upward facing corner surface 100 of the corner areas 10 and an upward facing edge surface 110 of the edge areas 11. A second vertical offset is provided between the upward facing edge surface 110 of the edge areas 11 and an upward facing center surface 120 of the center area 12. The upward facing corner surface 100, the upward facing edge surface 110 and the upward facing center surface 120 are directed vertically upwards. An outer area 16 is provided around the four corner areas 10 and the four edge areas 11, wherein a third vertical offset is provided between an upward facing outer surface 160 of the outer area 16 and the upward facing corner surface 100 of the four corner areas 10. Lateral recesses 161 are formed laterally in the periphery of the outer area 16.

Figure 2:
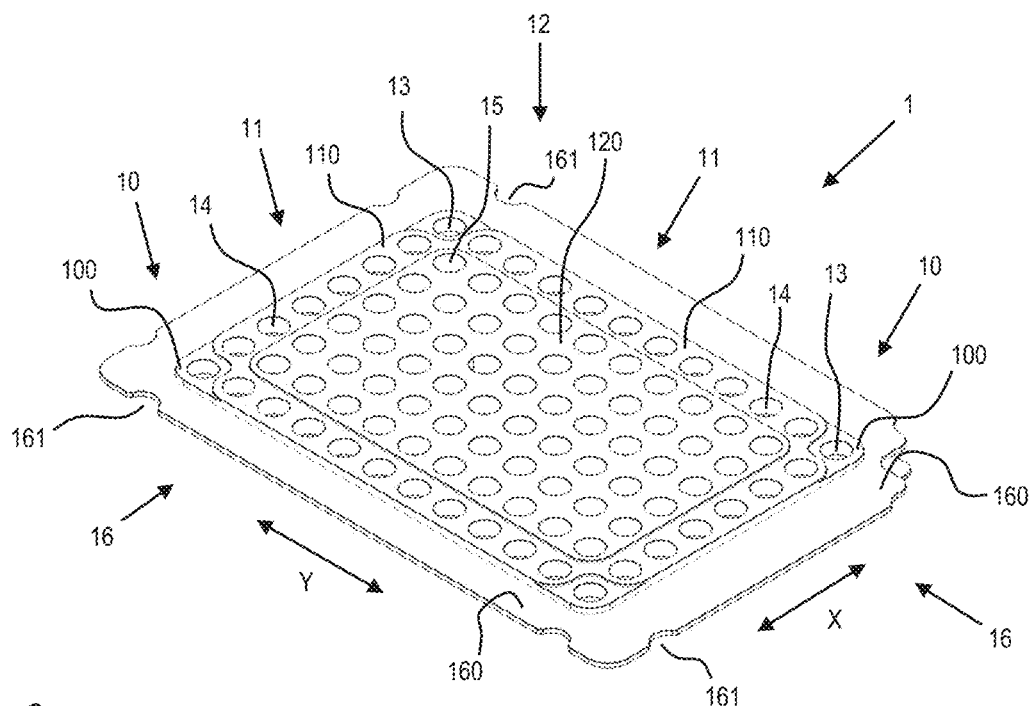
FIG. 2 the temperature equalizing plate of FIG. 1 with through-holes.

FIG. 2 shows the temperature equalizing plate 1 of FIG. 1 with a rectangular array of through-holes 13;14;15, extending in the first horizontal direction X and in the second horizontal direction Y. A corner hole 13 is arranged in each of the four corner areas 10, several edge holes 14 are arranged in each of the four edge areas 11 and several center holes 15 are arranged in the center area 12. Depicted is an exemplary 96-array with 8 by 12 through-holes 13;14;15, wherein there is one corner hole 13 in each of the corner areas 10, there are 8-2 edge holes 14 in the X-oriented edge areas 11, there are 12-2 edge holes 14 in the Y-oriented edge areas 11 and there are (8-2)*(12-2) center holes 15 in the center area 12. The diameter of the through-holes 13;14;15 corresponds to the well diameter of a 96-arrey microplate of about 6 mm. Some of the through-holes or all of them can be filled with a material transparent in a wavelength range of 200 nm to 1000 nm. For example, the through-holes in the corner are and/or the edge areas and/or the center area can be filled with such a transparent material.

Figure 3:
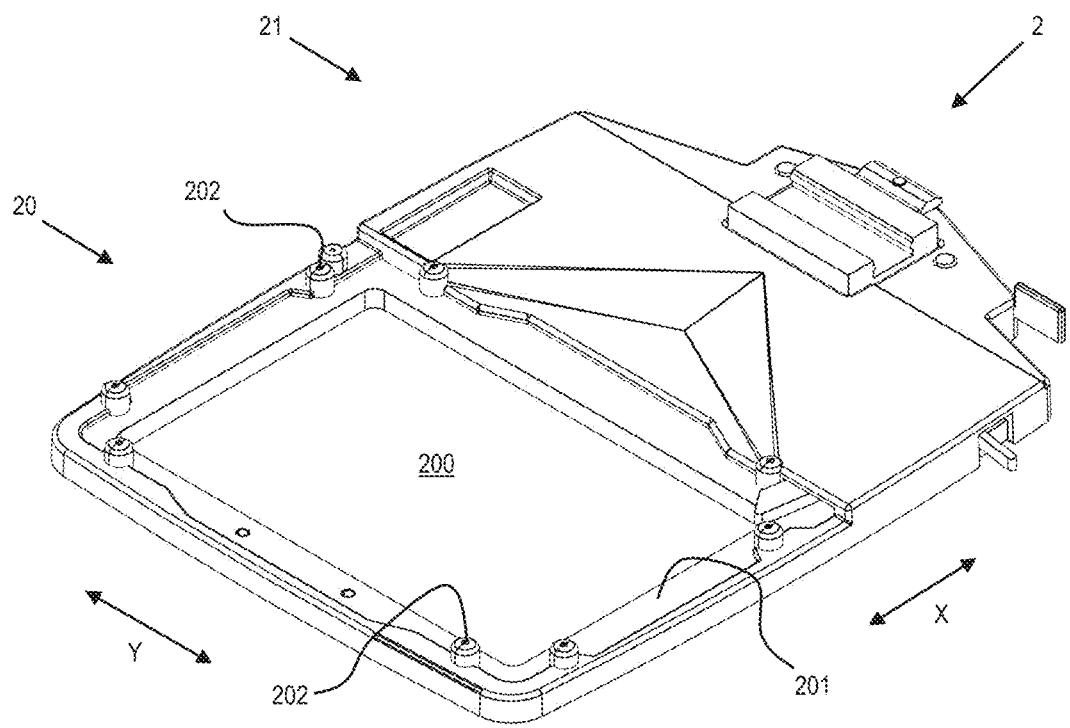
FIG. 3 a perspective view of a carriage of a micro plate reader.

FIG. 3 shows a perspective view of a carriage 2 of a micro plate reader. The carriage 2 comprising a front part 20 and a back part 21, wherein the front part 20 is frame-shaped with a cut-out 200 and provides a reception for the temperature equalizing plate. A vertically extending recess 201 is provided in the front part 20. Vertically upwards extending Positioning pins 202 are arranged in the peripheral area of the vertically extending recess 201.

Figure 4:
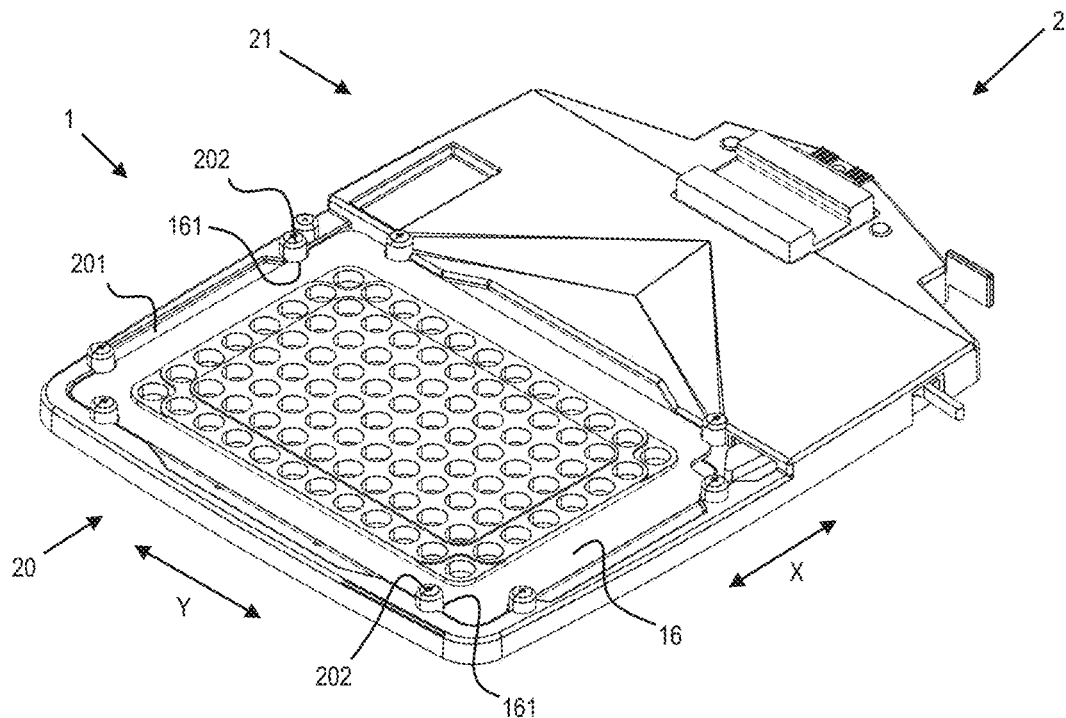
FIG. 4 a perspective view of the temperature equalizing plate of FIG. 2 arranged on a front part of the carriage of FIG. 3.

FIG. 4 shows a perspective view of the temperature equalizing plate 1 of FIG. 1 arranged on the front part 20 of the carriage 2 of FIG. 2. The temperature equalizing plate 1 nests on the vertically extending recess 201 of the carriage 2. The positioning pins 202 of the carriage 2 extend through the lateral recesses 161 of the temperature equalizing plate 1.

Figure 5:
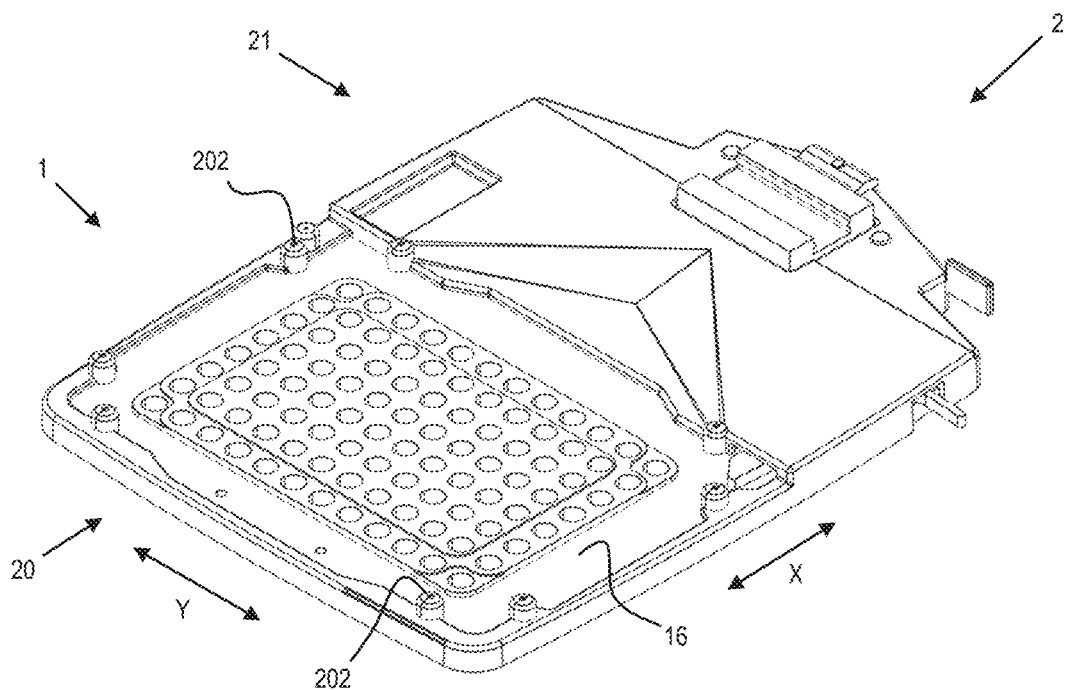
FIG. 5 a perspective view of a carriage with an integrated temperature equalizing plate in its front part.

FIG. 5 shows a perspective view of a carriage 2 with an integrated temperature equalizing plate 1 in its front part 20. This embodiment differs from the one of FIG. 3 only in that the temperature equalizing plate 1 is formed integrally in a single piece with the front part 20 of the carriage 2.

Figure 6:
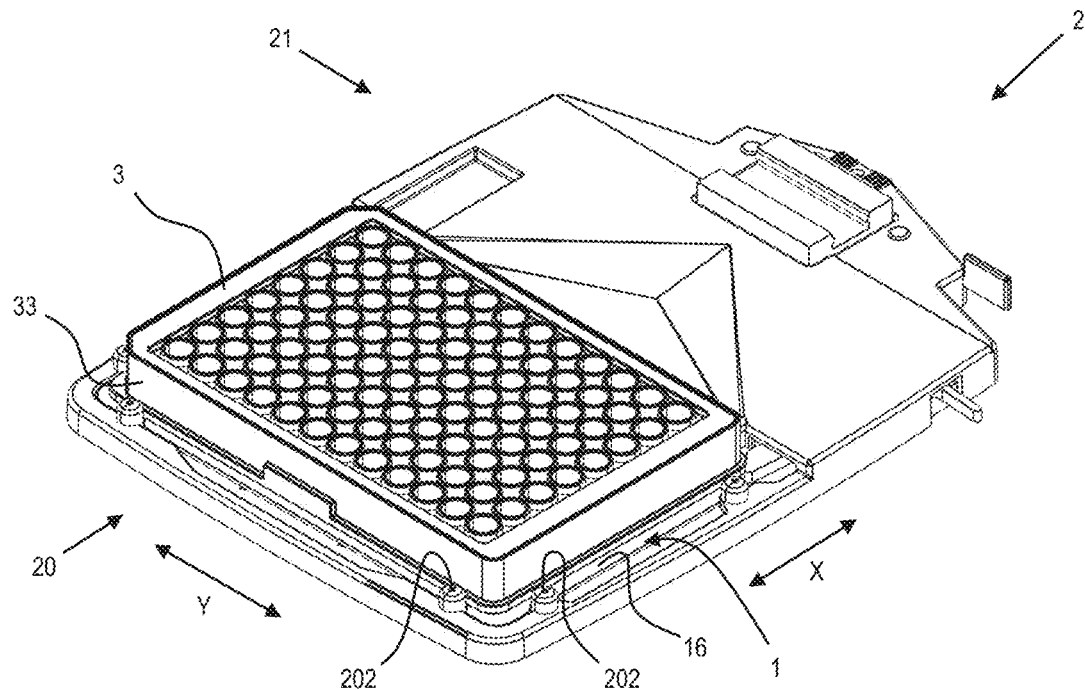
FIG. 6 a perspective view of a microplate arranged on a carriage with a temperature equalizing plate.

FIG. 6 shows a perspective view of an exemplary 96-array microplate 3 arranged on a carriage 2 with a temperature equalizing plate 1. The microplate 3 rests on the temperature equalizing plate 1 and the frame 33 of the microplate 3 laterally abuts the positioning pins 202.

Figure 7:
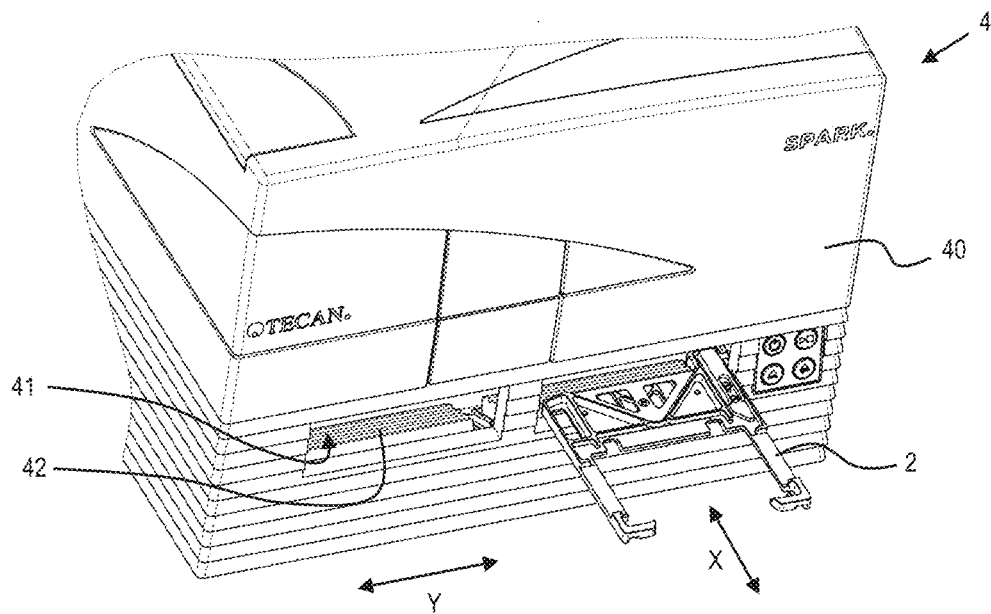
FIG. 7 a perspective view of a microplate reader with retractable carriages for microplates.

FIG. 7 shows a perspective view of a microplate reader 4 with retractable carriages 2 for microplates. The micro plate reader 4 comprising a housing 40 with at least one opening 41 through which a carriage 2 can transport microplates 3 in the first horizontal direction X from an exterior of the reader 4 into its interior and vice versa. The depicted carriage 2 has a fork-shaped front part.

Figure 8:
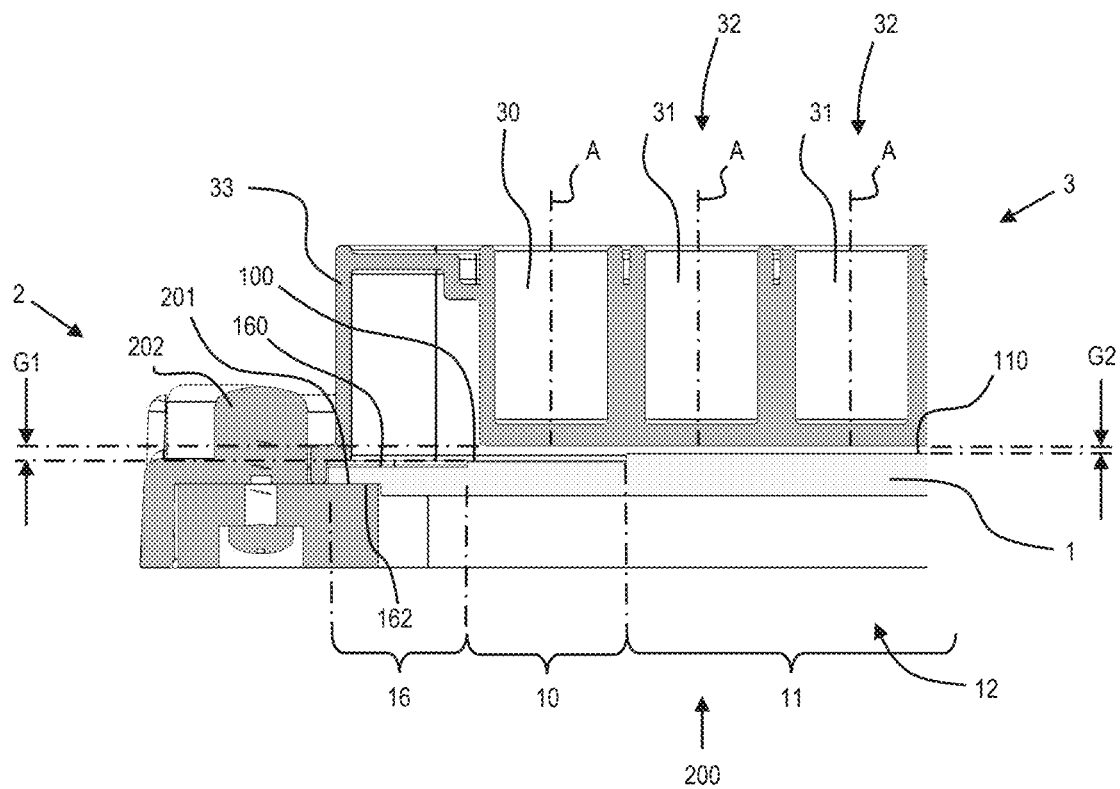
FIG. 8 a sectional view of the arrangement of FIG. 6 with a temperature equalizing plate of FIG. 1, though a corner area and an adjacent edge area of the temperature equalizing plate.

FIG. 8 shows a sectional view of the arrangement of FIG. 6 with a temperature equalizing plate 1 of FIG. 1, though a corner area 10 and an adjacent edge area 11 of the temperature equalizing plate 1. The microplate 3 has one corner well 30 above the corner area 10, has several edge wells 31 above the edge area 11 and has several center wells 32 above the center area 12 wells. In this sectional view, the center wells 32 and the center area 12 are behind the edge wells 31 and the edge area 11 of the depicted section plane. The wells 30;31;32 have straight sidewalls and flat bottoms. The temperature equalizing plate 1 is laterally centered in the cut-out 200 of the carriage 2 by means of the bottom recess 162. Since the outer dimensions of the temperature equalizing plate 1 are smaller than the inner dimensions of the microplate 3 a lateral gap is formed between the two, allowing the microplate 3 to rest with its frame 33 on the recess 201 of the carriage 2. The placement of the microplate 3 on the carriage 2 with such a temperature equalizing plate 1 is identical to its placement without one. The microplate 3 is laterally centered by means of the positioning pins 202. The first vertical offset in the corner area 10 results in a first gap G1 between the corner surface 100 and the bottom of the corner well 30. The second vertical offset in the edge area 11 results in a second gap G2 between the edge surface 110 and the bottom of the edge wells 31.

Figure 9:
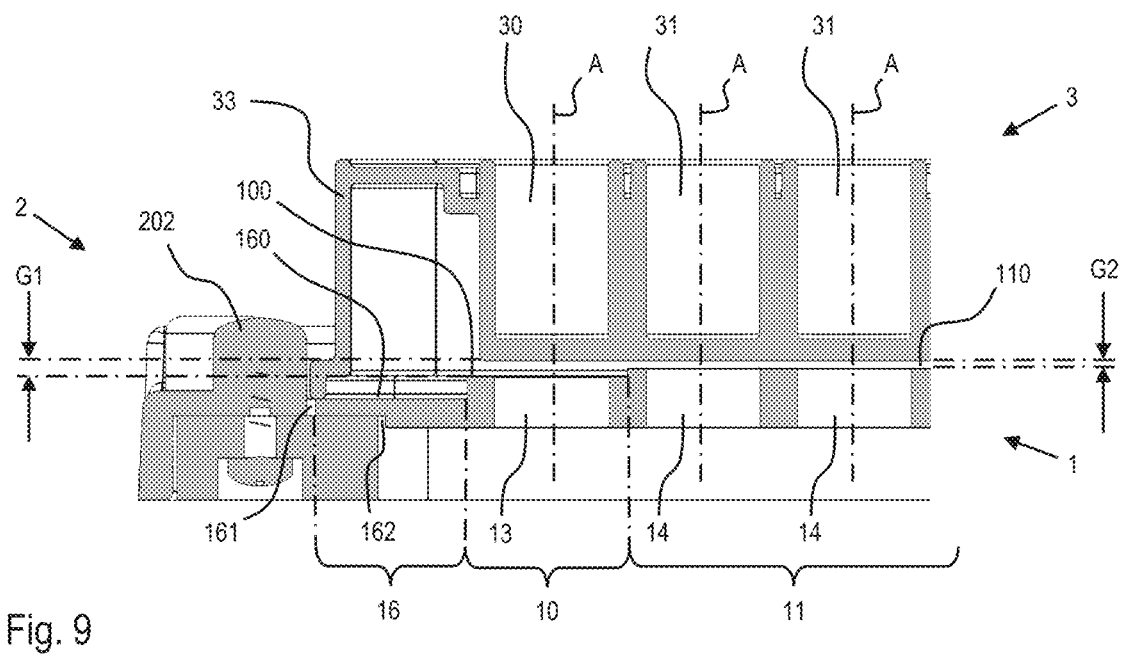
FIG. 9 a sectional view of the arrangement of FIG. 6 with a temperature equalizing plate of FIG. 2, through a corner hole and several edge holes of the temperature equalizing plate.

FIG. 9 shows a sectional view of the arrangement of FIG. 6 with a temperature equalizing plate 1 of FIG. 2 and with a microplate 3 with wells 30;31 with straight sidewalls and flat bottoms through a corner hole 13 and several edge holes 14 of the temperature equalizing plate 1. The central axis A of the wells 30;31 are collinear to the ones of the corresponding holes 13;14. The temperature equalizing plate 1 comprises a bottom recess 162 extending from the periphery of the outer area 16 and upwards from the bottom surface of the temperature equalizing plate 1, with which it rests on the carriage 2. The frame 33 of the microplate 3 rests on the outer surface 160 of the outer area 16. The first vertical offset in the corner area 10 resulting in a first gap G1 between the corner surface 100 and the bottom of the corner well 30. The second vertical offset in the edge area 11 resulting in a second gap G2 between the edge surface 110 and the bottom of the edge wells 31.

Figure 10:
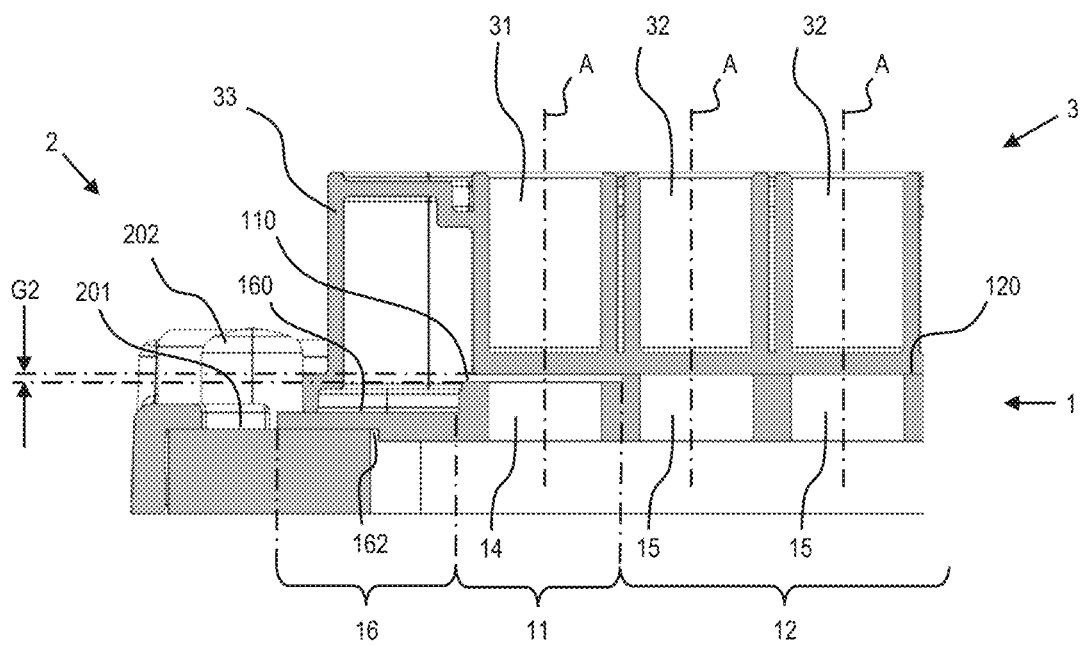
FIG. 10 a sectional view of the arrangement of FIG. 6 with a temperature equalizing plate of FIG. 2, through an edge hole and several center holes of the temperature equalizing plate.

FIG. 10 shows a sectional view of the arrangement of FIG. 6 with a temperature equalizing plate 1 of FIG. 2 through an edge hole 14 and several center holes 15 of the temperature equalizing plate 1. The bottom of the center wells 32 are in contact with the center surface 120 of the center area 12.

Figure 11:
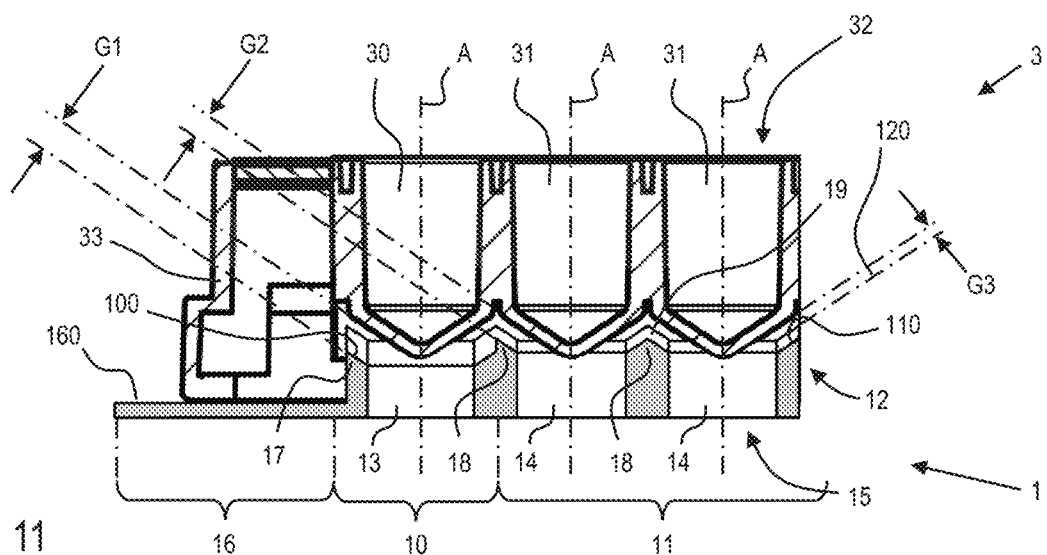
FIG. 11 a sectional view of an embodiment with a microplate with wells with straight sidewalls and V-shaped bottoms.

FIG. 11 shows a sectional view of an embodiment with a microplate with wells with straight sidewalls and V-shaped bottoms. The corner surface 100, the edge 110 and the center surface 120 are directed upwards and towards a central axis A of the corresponding through-holes 13;14;15 or wells 30;31;32, respectively. The upward facing corner surface 100 is comprised in a corner elevation 17, the upward facing edge surface 110 is comprised in an edge elevation 18 and the upward facing center surface 120 is comprised in a center elevation 19. The first vertical offset in the corner area 10 resulting in a first gap G1 between the corner surface 100 and the bottom of the corner well 30, the second vertical offset in the edge area 11 resulting in a second gap G2 between the edge surface 110 and the bottom of the edge wells 31 and the third vertical offset in the center area 12 resulting in a third gap G3 between the center surface 120 and the bottom the center well 32.

Figure 12:
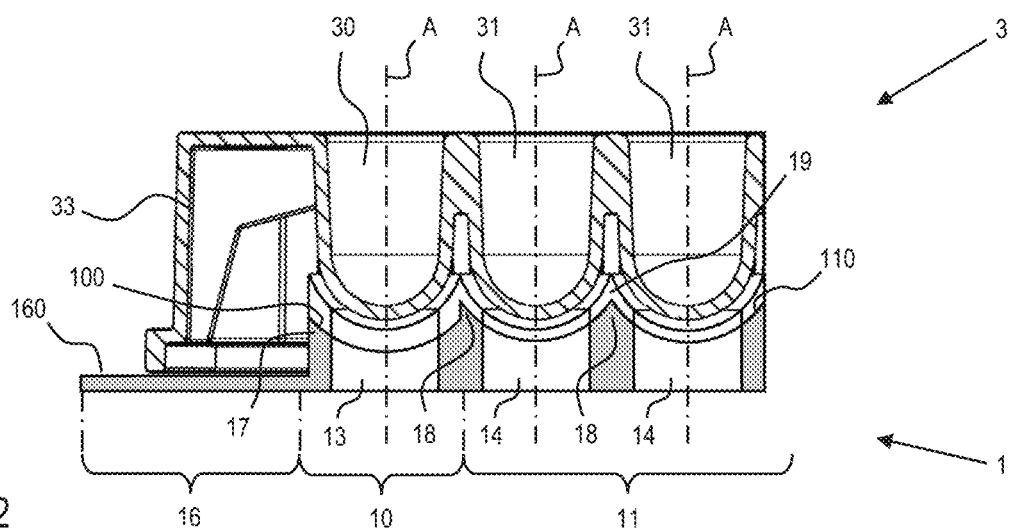
FIG. 12 a sectional view of an embodiment with a microplate with wells with straight sidewalls and U-shaped bottoms.

FIG. 12 shows a sectional view of an embodiment with a microplate 3 with wells with straight sidewalls and U-shaped bottoms. The shape of the corner surface 100, the edge surface 110 and the center surface correspond to the shape of the corresponding well bottom.

Like in FIG. 9, the upward facing surfaces are comprised in corresponding elevations, and the vertical offsets result in corresponding gaps between the temperature equalizing plate 1 and the bottom of the wells of the microplate 3.

Figure 13:
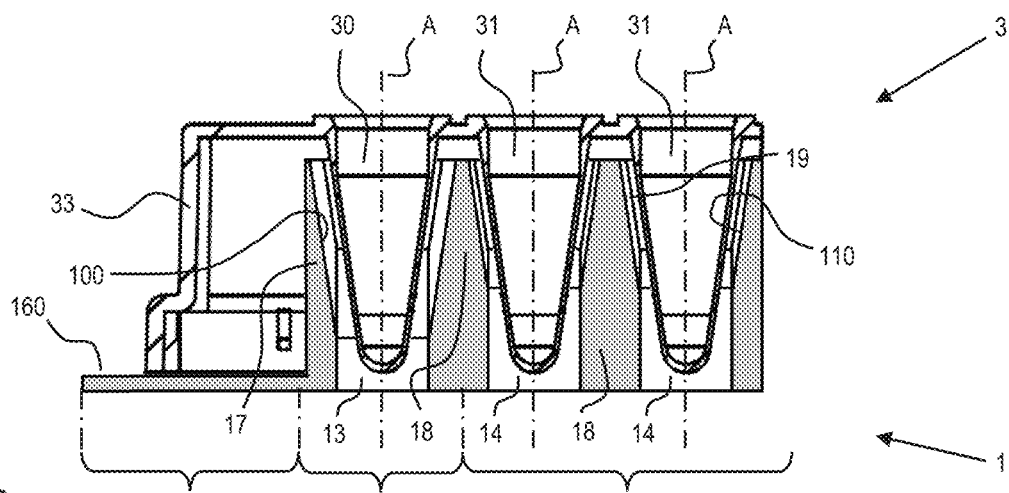
FIG. 13 a sectional view of an embodiment with a microplate with wells with tapered sidewalls and rounded bottoms.

FIG. 13 shows a sectional view of an embodiment with a microplate 3 with wells with tapered sidewalls and rounded bottoms. The shape of the corner surface 100, the edge surface 110 and the center surface correspond to the shape of the corresponding well sidewalls. Like in FIGS. 9 and 10, the upward facing surfaces are comprised in corresponding elevations, and the vertical offsets result in corresponding gaps between the temperature equalizing plate 1 and the sidewalls of the wells of the microplate 3.

Figure 14:
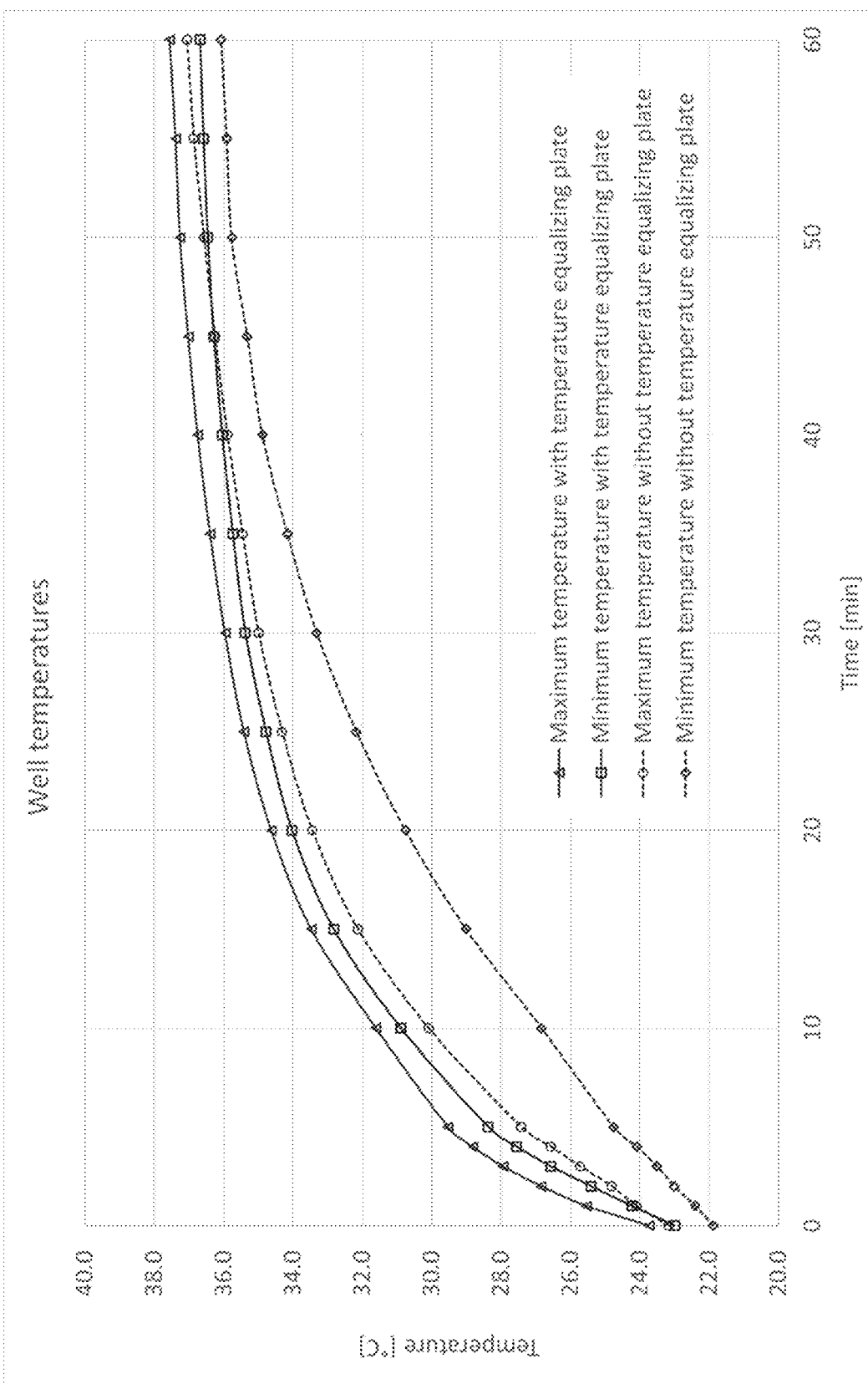
FIG. 14 a graph of the maximal and minimal well temperature curves of a microplate with and without temperature equalizing plate.

FIG. 14 shows a graph of the maximal and minimal well temperature curves of a microplate with and without temperature equalizing plate. It can be seen that the maximum and minimal well temperatures with temperature equalizing plate rise faster and are closer to each other than without temperature equalizing plate.

REFERENCE SIGNS LIST

1 Plate
10 Corner area
100 Corner surface
11 Edge area
110 Edge surface
12 Center area
120 Center surface
13 Corner hole
14 Edge hole
15 Center hole
16 Outer area
160 Outer surface
161 Lateral recess
162 Bottom recess
17 Corner elevation
18 Edge elevation
19 Center elevation
2 Carriage
20 Front part
200 Cut-out
201 Recess
202 Positioning pin
21 Back part
3 Microplate
30 Corner well
31 Edge well
32 Center well
33 Frame
4 Reader
40 Housing
41 Opening
42 Shutter
A Central axis
G1 First gap
G2 Second gap
G3 Third gap

What is claimed is:

1. A temperature equalizing plate (1) for a micro plate reader (4), onto which temperature equalizing plate (1) a microplate (3) with wells (30;31;32) can be removably arranged, the temperature equalizing plate (1) comprising:
a plate-shaped body extending in a first horizontal direction (X) and in a second horizontal direction (Y) and comprising four corner areas (10), four edge areas (11) and one center area (12), wherein each edge area (11) is arranged between two neighboring corner areas (10) and wherein the center area (12) is arranged between the four edge areas (11); and
wherein a first vertical offset is provided between an upward facing corner surface (100) of the corner areas (10) and an upward facing edge surface (110) of the edge areas (11), and wherein a second vertical offset is provided between the upward facing edge surface (110) of the edge areas (11) and an upward facing center surface (120) of the center area (12), resulting in gaps (G1;G2;G3) between at least some of the upward facing surfaces (100;110;120) of the temperature equalizing plate (1) and corresponding wells (30;31;32) of the thereon arranged microplate (3).

2. The temperature equalizing plate (1) according to claim 1, wherein the first vertical offset equals the second vertical offset or wherein the first vertical offset differs from the second vertical offset.

3. The temperature equalizing plate (1) according to claim 1, comprising a rectangular array of through-holes (13;14;15), extending in the first horizontal direction (X) and in the second horizontal direction (Y), wherein four corner holes (13) are arranged in the four corresponding corner areas (10), wherein edge holes (13) are arranged in the four corresponding edge areas (11), and wherein center holes (15) are arranged in the center area (12) of the array of through-holes (13;14;15).

4. The temperature equalizing plate (1) according to claim 3, wherein the upward facing corner surface (100), the upward facing edge surface (110), and the upward facing center surface (120) are directed vertically upwards or are directed upwards and towards a central axis (A) of the corresponding through-holes (13;14;15).

5. The temperature equalizing plate (1) according to claim 1, wherein the upward facing corner surface (100) is comprised in a corner elevation (17), wherein the upward facing edge surface (110) is comprised in an edge elevation (18) and wherein the upward facing center surface (120) is comprised in a center elevation (19).

6. The temperature equalizing plate (1) according to claim 5, wherein the corner elevation (17), the edge elevation (18) and the center elevation (19) are separate or sectionally interconnected pins that are arranged between the through-holes (13;14;15) or webs that extend between the through-holes (13;14;15) in the first horizontal direction (X) and the second horizontal direction (Y).

7. The temperature equalizing plate (1) according to claim 3, wherein two opposing first edge areas comprise the number of through-holes in the first horizontal direction (X) minus 2, wherein two opposing second edge areas comprise the number of through-holes in the second horizontal direction (Y) minus 2 and wherein the central area comprises the number of through-holes in the first horizontal direction (X) minus 2, times the number of through-holes in the second horizontal direction (Y) minus 2.

8. The temperature equalizing plate (1) according to claim 3, wherein the array of through-holes (13;14;15) is a 12-array with 3 by 4 through-holes or a 24-array with 4 by 6 through-holes or 48-array with 6 by 8 through-holes or a 96-array with 8 by 12 through-holes or a 384-array with 16 by 24 through-holes or a 1536-array with 32 by 48 through-holes.

9. The temperature equalizing plate (1) according to claim 1, wherein an outer area (16) is provided horizontally outward the four corner areas (10) and the four edge areas (11), wherein a third vertical offset is provided between an upward facing outer surface (160) of the outer area (16) and the upward facing corner surface (100) of the corner area (10).

10. The temperature equalizing plate (1) according to claim 8, wherein the third vertical offset equals the first vertical offset and/or the second vertical offset, or wherein the third vertical offset differs from the first vertical offset and the second vertical offset.

11. The temperature equalizing plate (1) according to claim 1, wherein the first vertical offset ranges from 0.1 mm to 5.0 mm and wherein the second vertical offset ranges from 0.1 mm to 5.0 mm.

12. The temperature equalizing plate (1) according to claim 8, wherein the third vertical offset ranges from 0.1 mm to 10.0 mm.

13. The temperature equalizing plate (1) according to claim 1, wherein the temperature equalizing plate (1) is made from a thermally conductive material, such as thermally conductive plastic or thermally conductive metal and/or the temperature equalizing plate (1) is made from a material, transparent in a wavelength range of 200 nanometers to 1000 nanometers.

14. The temperature equalizing plate (1) according to claim 3, wherein the through-holes (13;14;15) are filled with a thermally conductive material, such as thermally conductive plastic or thermally conductive metal and/or the through-holes (13;14;15) are filled with a material, transparent in a wavelength range of 200 nanometers to 1000 nanometers.

15. A kit comprising a temperature equalizing plate (1) according to claim 1 and a microplate (3) with a rectangular array of wells (30;31;32), extending in the first horizontal direction (X) and in the second horizontal direction (Y), wherein the through-holes (13;14;15) of the temperature equalizing plate (1) are aligned with the wells (30;31;32) of the microplate (3), wherein the first vertical offset and the second vertical offset resulting in a first gap between the upward facing corner surface (100) of the corner areas (10) and a corresponding corner well (30) and resulting in a second gap between the upward facing edge surface (110) of the edge areas (11) and a corresponding edge well (31).

16. The kit according to claim 15, wherein the first gap and/or the second gap is a multiple of the third gap.

17. The kit according to claim 15, wherein an outer dimension of the temperature equalizing plate (1) in the first horizontal direction (X) is smaller than a corresponding inner dimension of a frame (33) of the microplate (3) and wherein an outer dimension of the temperature equalizing plate (1) in the second horizontal direction (Y) is smaller than a corresponding inner dimension of said frame (33).

18. A micro plate reader (4) comprising a housing (40) with at least one opening (41) through which a carriage (2) can transport microplates (3) in the first horizontal direction (X) from an exterior of the reader (4) into its interior, wherein the carriage (2) comprises a temperature equalizing plate (1) according to claim 1.

19. The micro plate reader (4) according to claim 18, wherein the carriage (2) comprising a front part (20) that can pass through the at least one opening (41) and a back part (21), which always remains in the housing (40) and which is connected to a drive with which a movement in the first horizontal direction (X) can be effected, wherein the front part (20) of the carriage (2) is frame-shaped and the temperature equalizing plate (1) is arranged thereon or wherein the temperature equalizing plate (1) is formed integrally in a single piece with the front part (20) of the carriage (2).

20. The micro plate reader (4) according to claim 19, wherein a vertically extending recess (201) is provided in the front part (20) of the carriage (2), and wherein the temperature equalizing plate (1) is arranged in the vertically extending recess (201).

21. A micro plate reader (4) comprising a housing (40) with at least one opening (41) through which a carriage (2) can transport microplates (3) in the first horizontal direction (X) from an exterior of the reader (4) into its interior, wherein the carriage (2) comprises a kit according to claim 15.

\* \* \* \* \*